R. CAUDRON.
DETACHABLE FUEL TANK.
APPLICATION FILED AUG. 9, 1918.

1,379,525.

Patented May 24, 1921.
2 SHEETS—SHEET 1.

Witnesses:
Norris L. Sumby

Inventor
René Caudron
By Norris L. Norris,
Attorney

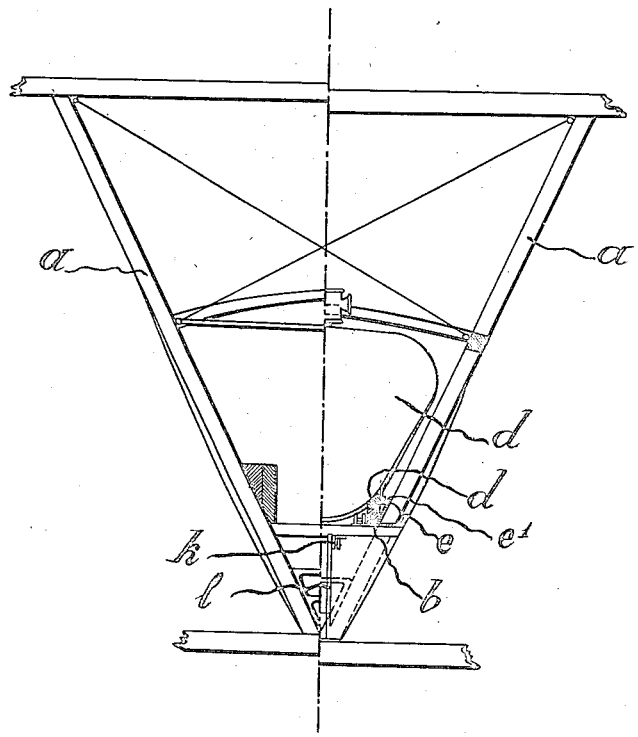

UNITED STATES PATENT OFFICE.

RENÉ CAUDRON, OF ISSY LES MOULINEAUX, FRANCE.

DETACHABLE FUEL-TANK.

1,379,525.   Specification of Letters Patent.   Patented May 24, 1921.

Application filed August 9, 1918. Serial No. 249,216.

*To all whom it may concern:*

Be it known that I, RENÉ CAUDRON, citizen of the French Republic, residing at Issy les Moulineaux, Department of Seine, France, have invented certain new and useful Improvements in Detachable Fuel-Tanks, of which the following is a specification.

This invention relates to the arrangement of fuel tanks or reservoirs aboard motor driven vehicles, flying machines, or the like.

It has for its object to provide an arrangement which renders it possible, in the event of a fuel tank catching fire, or being disabled, to detach it rapidly and readily from its connections and to cause it to drop overboard.

To this end an arrangement according to this invention comprises a locking and releasing device for the connection of the tank with the machine on which it is mounted, and the arrangement of the tank on its support so that immediately the locking device is actuated in the releasing sense, the tank affected is caused automatically to be displaced and to vacate its support in the machine.

This and other features of this invention will now be fully described with reference to the accompanying drawings in which:

Fig. 2 shows in one half a section on the line 2—2 of Fig. 1 and in the other half a section on the line 2'—2' of Fig. 1.

Figure 1:
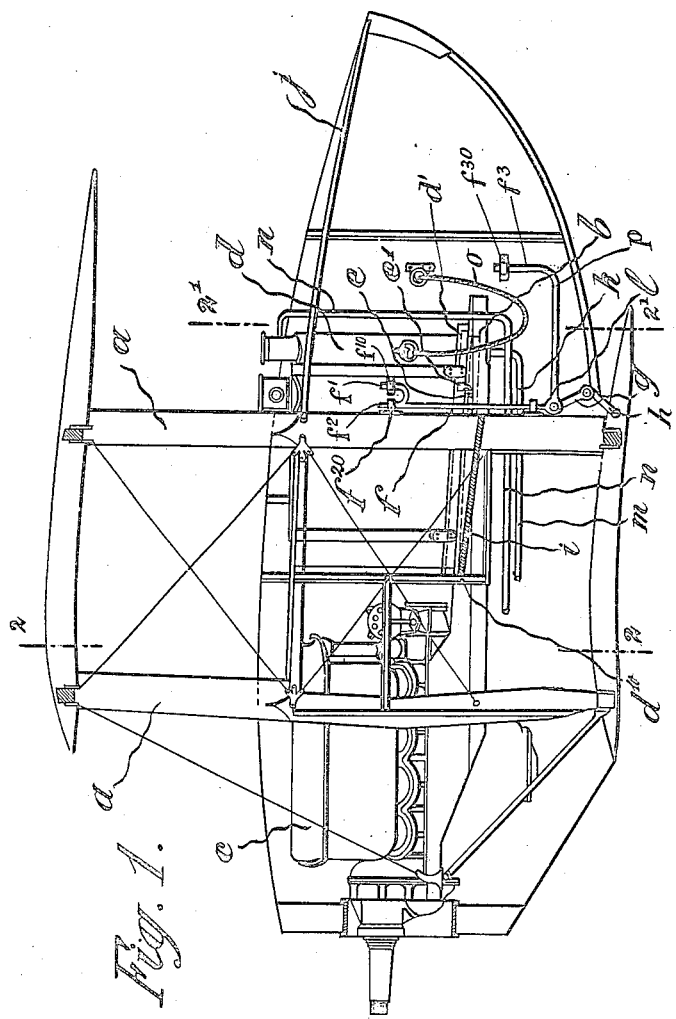
Figure 1 shows by way of example in a partial sectional view axially through one of the engine cars, a twin engine aeroplane provided with an arrangement according to this invention.

In the example shown, each of the engine cars is constituted substantially by two pairs of struts $a$ connecting between them the two carrying surfaces of the aeroplane each in the form of a V-strut, and by beams $b$ secured to the said struts and destined to support the engine $c$ and the tank $d$, the former being bolted to the forward part of the said beams, and the latter supported upon the rear portion thereof.

In order to hold the tank $d$ in position, it is secured for instance, by means of metal bands to a frame $d'$ arranged so as to glide slide-fashion in grooves provided in the beams $b$ in such manner that the said frame tends to move to the rear.

By preference, moreover, the said frame is provided with hooks $e'$ with their noses directed in forward direction and so that when the said frame has been pushed home from the rear to the front on its support, the hooks are engaged in eyelets $e$ mounted on the supporting beams and prevent the said frame and the tank from rising therefrom.

Arranged against each rear strut is a rod $f$ capable of being displaced longitudinally of the said struts, and each of these rods is provided with a U-shaped hook having two arms $f'$, $f^2$ directed upwardly so as to engage with eyelets $f^{10}$, $f^{20}$ secured, respectively, on the tank $d$ and the struts $a$. The lower ends of the two rods $f$ are connected by a rod $g$ to a lever $h$. This lever is mounted on the end of a horizontal shaft journaled by preference to the interior of the lower plane and having its other end provided with a hand lever placed within reach of the pilot whereby the latter in actuating the lever is able instantly either to engage the hooks $f'$, $f^2$ with the eyelets $f^{10}$, $f^{20}$ or to disengage them therefrom at will.

After disengaging the hooks $f'$, $f^2$ from the eyelets $f^{10}$, $f^{20}$, in order to force the tank to slide to the rear and to release itself from the car, the grooves in the beams $b$ are given a gradual slant rearwardly and elastic connections $i$ are preferably hooked to a holder $d^{10}$ secured to the frame $d'$ in front of the latter, so as to tend to pull the said frame and fuel tank in rearward direction.

Consequently, if a fuel tank is set alight, the pilot need only operate the corresponding hand lever in order to disengage the hooks $f'$, $f^2$ from the eyelets $f^{10}$, $f^{20}$ so that the tank thus freed slides to the rear and drops from the car, the displacement of the tank being facilitated by the vibration of the engine and may in addition be aided by the pilot slightly tilting the machine.

It is further advantageous, as shown in Fig. 1, in order to diminish the air resistance, to terminate the rear of the car not by the rear of the tank itself but by a slip cage $j$ adapted to surround rearwardly and eventually partly laterally the tank $d$, such slip cage may either form an integral part of the tank and the tank carrying frame, or may be adapted to be released from the airship more or less independently of the tank.

This slip cage is in the case of its being more or less independent of the fuel tank, so connected to the rear struts $a$ that it may be detached from the car at the same time as the tank itself when it is desired to get rid of the tank. To this end use is made in the case of disposing of a slip cage more or less independent from the fuel tank of additional hooks $f^3$ fixed to the rods $p$, and engaging eyelets $f^{30}$ carried by the cage, and being engaged therewith or disengaged therefrom at the same time as the hooks $f'$, $f^2$ are engaged with or disengaged from the eyelets $f^{10}$, $f^{20}$.

Where such an independent slip cage is employed, the wind pressure carries it away with a great force and therefore the fuel tank $d$ may with advantage be connected thereto by thin cables so that such cage as soon as released, being much lighter than the tank and thus the first to be pulled rearward by the pressure and suction of the air, facilitates on the one hand the detachment of the tank from the car owing to the fact that the air by being entangled in the released cage, thus insuring an additional traction and on the other hand, being connected by the heavy tank which readily falls to the ground the slip cage is forced to drop together with the latter and cannot strike or damage the tail of the machine.

The arrangement hereinbefore described may be employed *per se*, or it may by preference be used jointly with any kind of a known arrangement (not shown) for interrupting at once the connection between the feed pipes of the tank and the pipes leading to the engine and to its accessories, so that when the release of the tank is assured, the connection between the feed pipes of the tank and the pipes $m$ and $n$ leading respectively to the air pump and the carbureter of the engine is automatically severed.

Moreover, the connections between the two engines are preferably such that if one of the tanks is disabled the two engines may still be supplied from the remaining tank.

As will be understood, the invention is capable of numerous modifications or structural variations obvious to those skilled in the art, without departing from the spirit thereof.

Having now particularly described and ascertained the nature of my said invention, and in what manner the same is to be performed, I declare that what I claim is:—

1. In an airplane the combination of a tank supporting frame, a number of fuel tanks mounted in said frame, rearwardly slanting slide-ways for said frame, and releaseable means for normally holding the fuel tanks in position and capable of permitting the fuel tanks to escape rearwardly down the slide-ways during the flight of the airplane.

2. The combination as in claim 1 and moreover a rearwardly pointed cage surrounding the rear part of the fuel tank so as to diminish that part of the air resistance, during the flight, which occurs owing to the rear parts of the fuel tanks.

3. The combination as in claim 1, said means for releasing the fuel tanks consisting of a number of horizontal hook and eyelet fastening means on the rear part of the tank frame and on the front part of the tank frame a number of vertical hook and eyelet fastening means, the hooks thereof being adapted to be set out of engagement of the eyelets.

4. The combination as in claim 2 and moreover, elastic means arranged so as to help the action of the suction and pressure of the air which act so as to force the released tank rearward.

5. The combination as in claim 4 and moreover a rear part or slip cage for the fuel tank in order to diminish its air resistance, said rear part being fastened to the airship by hooks and eyelets independently of the releasable fuel tank system and connected thereto by means of flexible cables of such a length that the said slip cage may receive the full pressure action of the air in order to pull on the tank system but not too long so that the slip cage may rapidly be pulled down by the falling fuel tank, and means for simultaneously releasing both the fuel tank and the slip cage.

In testimony whereof I have hereunto set my hand in presence of two subscribing witnesses.

RENÉ CAUDRON

JOHN F. SIMONS,
PAUL BLUON.